(12) United States Patent
Rouleau

(10) Patent No.: US 10,811,857 B2
(45) Date of Patent: Oct. 20, 2020

(54) BRACKET FOR CABLE MANAGEMENT

(71) Applicant: Panduit Corp., Tinley Park, IL (US)

(72) Inventor: Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/804,894

(22) Filed: Feb. 28, 2020

(65) Prior Publication Data

US 2020/0287365 A1    Sep. 10, 2020

Related U.S. Application Data

(60) Provisional application No. 62/814,380, filed on Mar. 6, 2019.

(51) Int. Cl.
*H02G 3/04* (2006.01)
*F16L 3/06* (2006.01)
*F16M 13/02* (2006.01)

(52) U.S. Cl.
CPC .............. *H02G 3/0456* (2013.01); *F16L 3/06* (2013.01); *F16M 13/02* (2013.01)

(58) Field of Classification Search
CPC .......... H02G 3/0456; F16L 3/06; F16M 13/02
USPC ...................................................... 174/70 R
See application file for complete search history.

(56) References Cited

U.S. PATENT DOCUMENTS

| | | | |
|---|---|---|---|
| 2,470,992 A | 5/1949 | Kindorf et al. | |
| 2,551,146 A | 5/1951 | Marincic | |
| 3,053,494 A | 9/1962 | Stoll | |
| 3,667,711 A | 6/1972 | Kissel | |
| 4,136,423 A | 1/1979 | Sterling | |
| 4,369,945 A * | 1/1983 | Mantoan | E06C 1/56 248/223.41 |
| 4,542,871 A | 9/1985 | Fortsch | |
| 4,646,395 A | 3/1987 | Mayszak | |
| 4,770,378 A | 9/1988 | Onishi et al. | |
| 4,779,828 A * | 10/1988 | Munch | H02G 3/32 248/74.3 |
| 4,789,286 A | 12/1988 | Laput | |
| 6,343,771 B1 | 2/2002 | Simon | |
| 6,354,542 B1 | 3/2002 | Meyer et al. | |
| 6,471,171 B1 * | 10/2002 | VanderVelde | H02G 3/32 248/229.12 |
| 6,588,771 B2 | 7/2003 | Onishi | |
| 7,490,802 B1 | 2/2009 | Teng | |
| 7,677,514 B1 | 3/2010 | Palmer | |

(Continued)

FOREIGN PATENT DOCUMENTS

WO    2004036693 A1    4/2004
WO    2013020567 A1    2/2013

*Primary Examiner* — Sherman Ng
(74) *Attorney, Agent, or Firm* — Christopher S. Clancy; James H. Williams; Aimee E. McVady

(57) ABSTRACT

A bracket that manages cables on a ladder rack. The bracket includes a rung insertion area and an upper member. The rung insertion area is defined by a bottom, sidewalls extending from the bottom, and gussets extending from the bottom and positioned between the sidewalls. Each sidewall includes a top and two curved arms and each gusset includes a top and two sides. Slots are formed between each curved arm of the sidewalls and each side of the gusset. A ladder rung is inserted in the slots of the bracket to secure the ladder rung to the bracket.

18 Claims, 15 Drawing Sheets

(56) References Cited

U.S. PATENT DOCUMENTS

| | | |
|---|---|---|
| 8,480,041 B2 | 7/2013 | Myers |
| 8,714,495 B2 | 5/2014 | Myers |
| 8,714,502 B1 | 5/2014 | Davis |
| 8,931,747 B2 | 1/2015 | Davis |
| 9,548,598 B2 | 1/2017 | Tally et al. |
| 9,587,433 B2 | 3/2017 | Sylvester et al. |
| 9,882,365 B2 | 1/2018 | Sylvester et al. |
| 10,100,861 B2 | 10/2018 | Zhang |
| 10,407,985 B2 | 9/2019 | Sylvester et al. |
| 2011/0315829 A1* | 12/2011 | Darnell ............ H02G 3/0456 248/67.5 |
| 2014/0239131 A1* | 8/2014 | Sylvester ............ E06C 7/14 248/68.1 |
| 2015/0275578 A1* | 10/2015 | Sylvester ............ H02G 3/32 248/68.1 |
| 2016/0025244 A1* | 1/2016 | Tally ............ H02G 3/32 248/72 |
| 2016/0340978 A1* | 11/2016 | Sylvester ............ H02G 3/32 |
| 2018/0163469 A1 | 6/2018 | Sylvester et al. |

\* cited by examiner

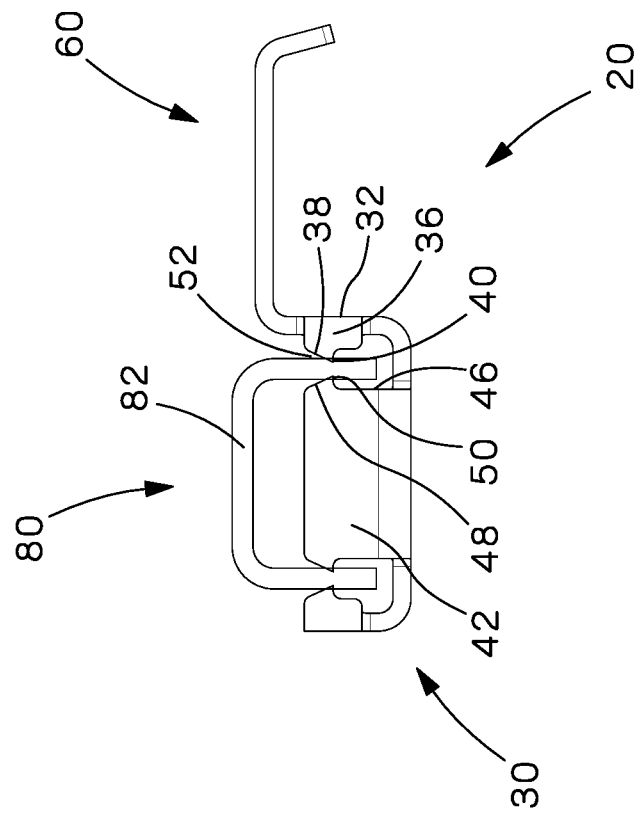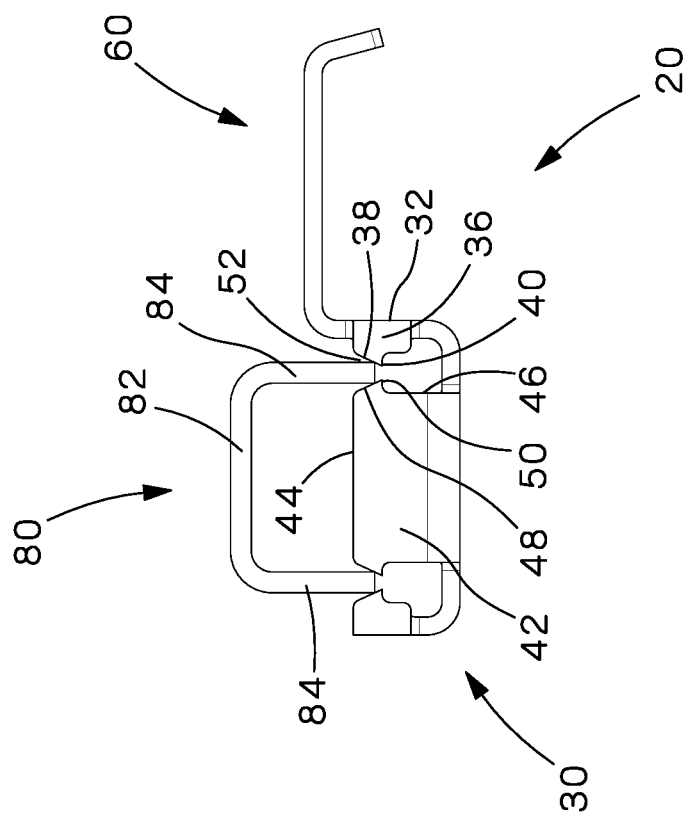

BRACKET FOR CABLE MANAGEMENT

CROSS-REFERENCE TO RELATED APPLICATIONS

This application claims priority to U.S. Provisional Application No. 62/814,380, filed Mar. 6, 2019, the subject matter of which is hereby incorporated by reference in its entirety.

FIELD OF THE INVENTION

The present invention relates to a bracket for cable management, and more particularly to a bracket for cable management on a U-shaped ladder rung of a ladder rack.

BACKGROUND OF THE INVENTION

Conventional cable cleats have been typically used to secure wire or cable bundles to panels, ladder racks, or similar structural members. The cable cleats include a mounting surface and a body portion that receives the wires or cable bundles. Conventional cable cleats, however, are generally difficult and time consuming to install. Thus, it is desirable to provide a bracket that is efficiently installed thereby significantly reducing labor costs and increasing productivity.

SUMMARY OF THE INVENTION

A bracket that secure cables to a ladder rack. The bracket includes a rung insertion area and an upper member. The rung insertion area is defined by a bottom, sidewalls extending from the bottom, and gussets extending from the bottom and positioned between the sidewalls. Each sidewall includes a top and two curved arms. Each gusset includes a top and two sides. Slots are formed between each curved arm of the sidewalls and each side of the gusset. The bracket is secured to a ladder rung by inserting the ladder rung in the slots of the bracket for cable management on the ladder rung.

A cable management assembly that secures cables to a ladder rung of a ladder rack. The cable management assembly includes a bracket and a metal tie. The bracket includes a rung insertion area and an upper member that receives cables. The rung insertion area is defined by a bottom, sidewalls extending from the bottom, and gussets extending from the bottom and positioned between the sidewalls. Each sidewall includes a top and two curved arms and each gusset includes a top and two sides. Slots are formed between each curved arm of the sidewalls and each side of the gussets. The bracket receives the ladder rung in the slots of the bracket and the metal tie secures the cables to the upper member of the bracket.

BRIEF DESCRIPTION OF THE DRAWINGS

FIG. 9A is a side view of the bracket for cable management of FIG. 8 with a U-shaped ladder rung positioned to be installed.

FIG. 9B is a side view of the bracket for cable management of FIG. 9B with the U-shaped ladder rung installed in the bracket.

DETAILED DESCRIPTION

Figure 1:
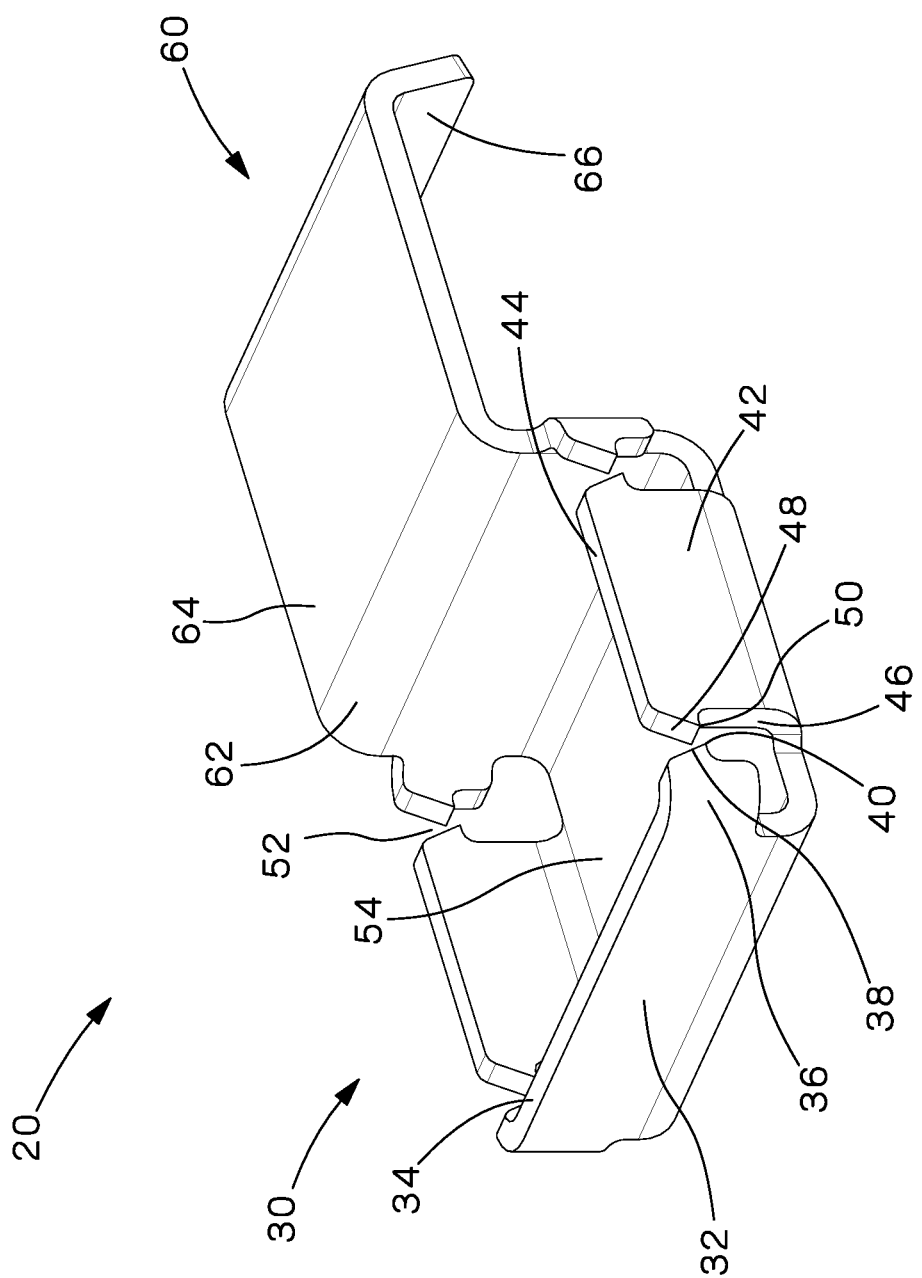
FIG. 1 is a top perspective view of the bracket for cable management of the present invention.
Figure 2:
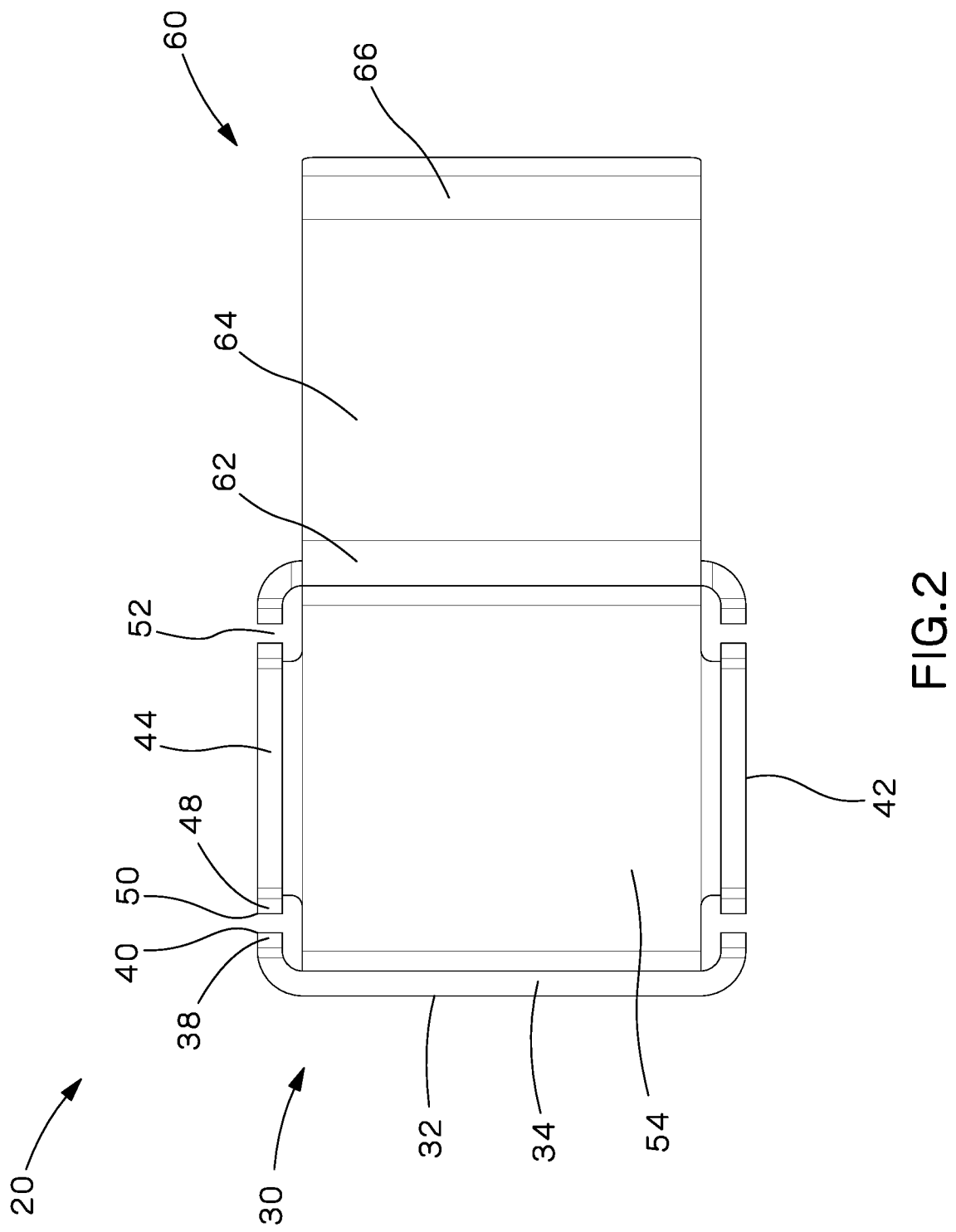
FIG. 2 is a top view of the bracket for cable management of FIG. 1.
Figure 3:
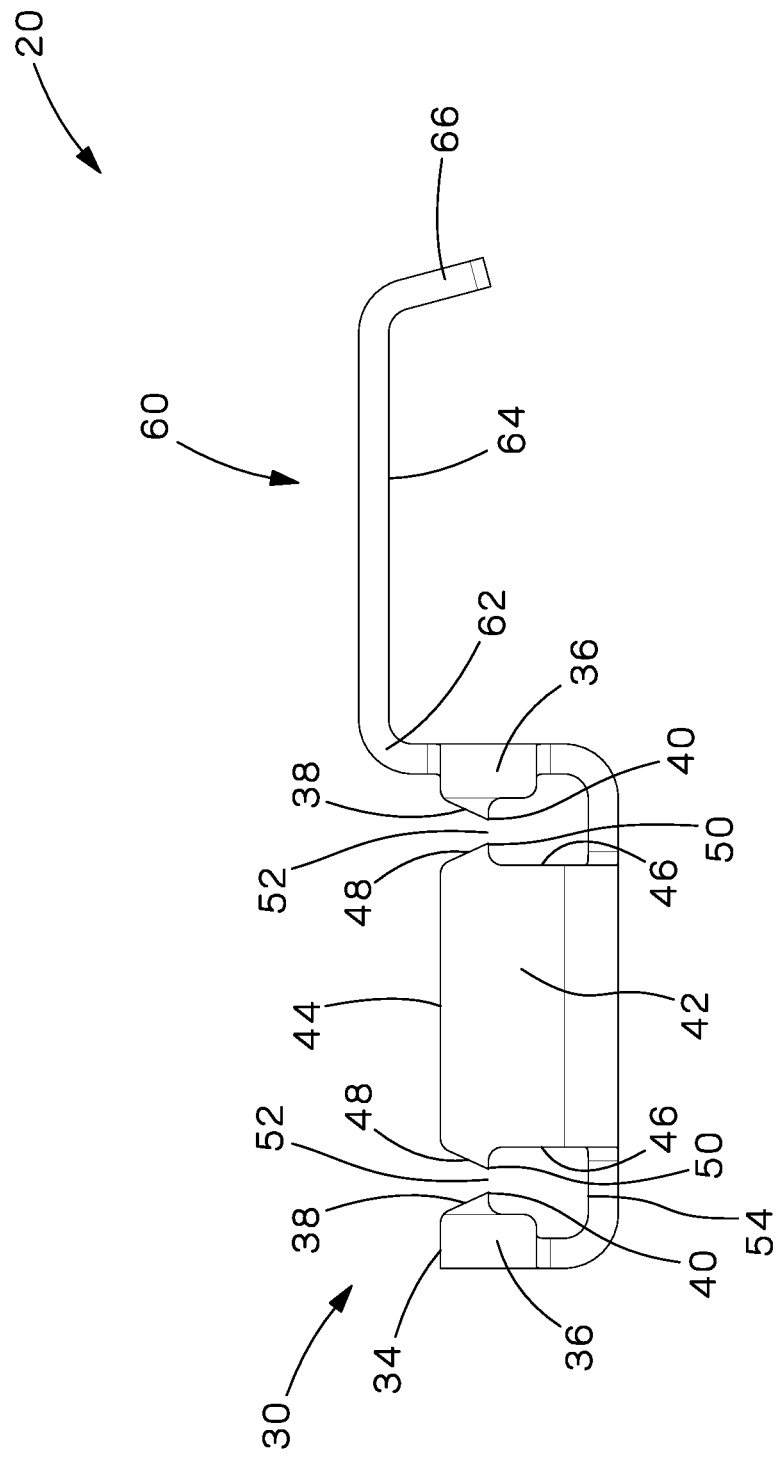
FIG. 3 is a right side view of the bracket for cable management of FIG. 1.
Figure 4:
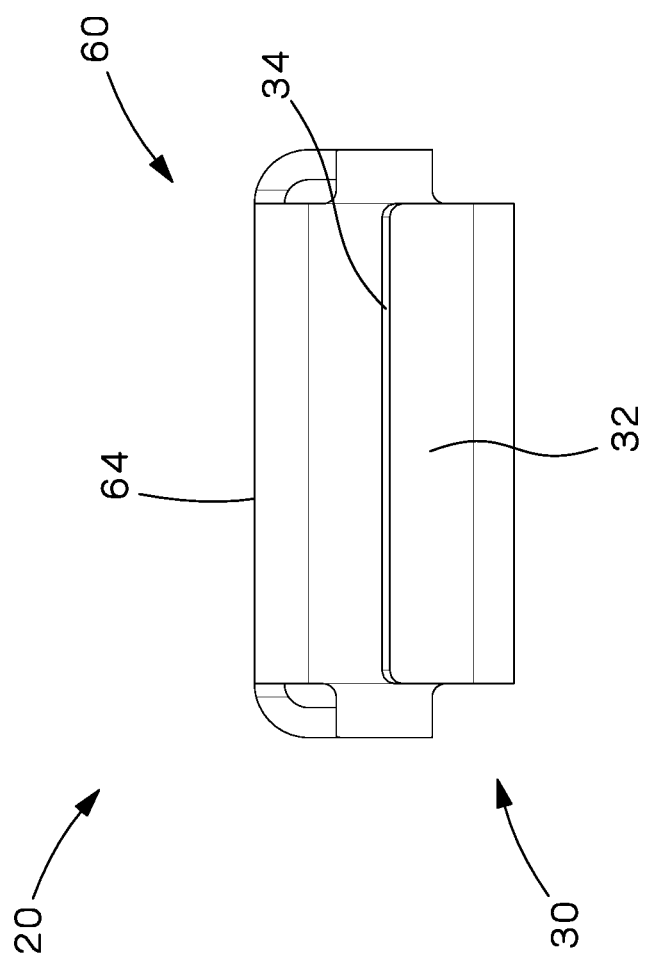
FIG. 4 is a front side view of the bracket for cable management of FIG. 1.
Figure 5:
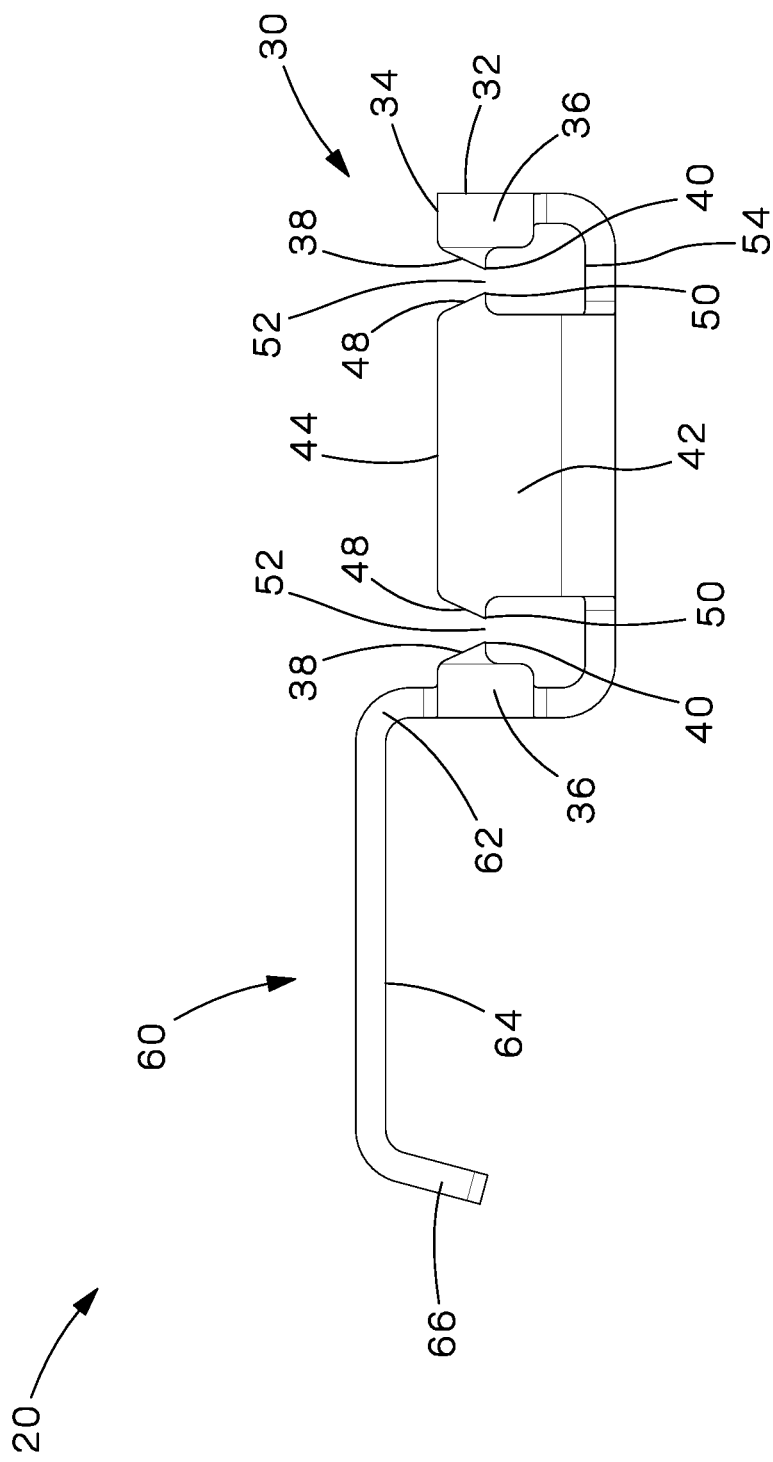
FIG. 5 is a left side view of the bracket for cable management of FIG. 1.
Figure 6:
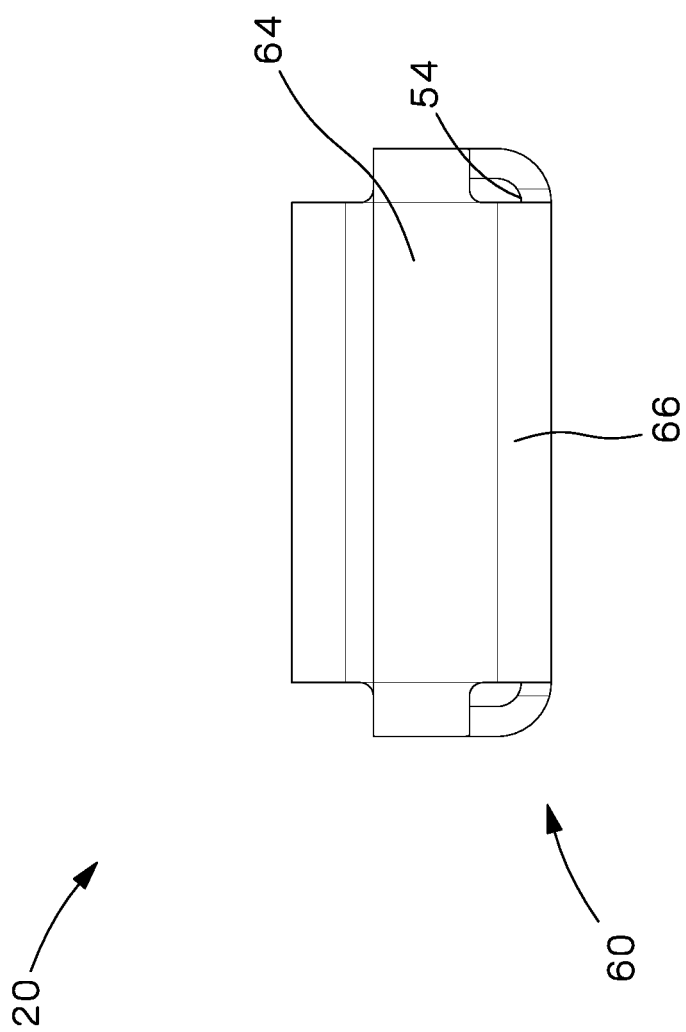
FIG. 6 is a rear side view of the bracket for cable management of FIG. 1.
Figure 7:
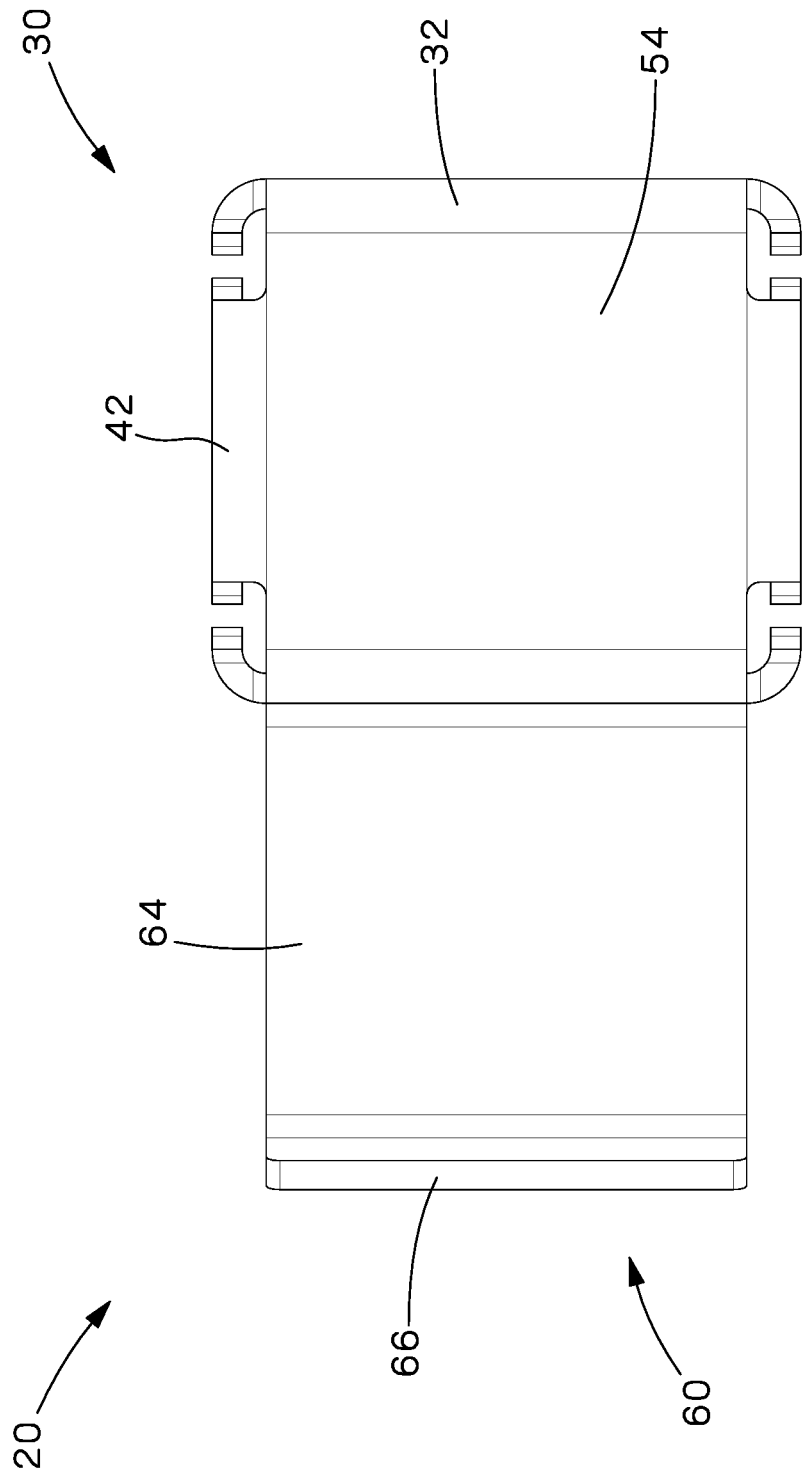
FIG. 7 is a bottom view of the bracket for cable management of FIG. 1.

The present invention is directed to a bracket that is securely attached to a U-shaped ladder rung of a ladder rack.

FIGS. 1-7 illustrate the bracket 20 of the present invention. The bracket 20 includes a rung insertion area 30 defined by two sidewalls 32, two gussets 42, and a bottom 54. Each sidewall 32 includes a top 34 and two curved arms 36. Each curved arm 36 includes an angled ramp 38 that leads to a pointed barb 40 that extends in a direction away from the sidewall 32.

The gussets 42 include a top 44 and two sides 46. The tops 44 of the gussets 42 and the tops 34 of the sidewalls 32 are in the same plane. The gusset 42 also include angled ramps 48 that lead to a pointed barb 50 extending from each side 46. The pointed barbs 40 extending from each sidewall 32 align with one of the pointed barbs 50 extending from the gusset 42 to form narrow slots 52. The slots 52 are narrower than the thickness of the sidewalls 84 of the U-shaped rung 80 (see FIG. 9B) thereby providing an interference fit with the U-shaped ladder rung 80. Once installed, the barbs 40, 50 hold the bracket 20 in place on the U-shaped ladder rung 80.

The bracket 20 also includes an upper member 60 with a first curved end 62 that extends from the top 34 of one of the sidewalls 32, a horizontal member 64, and a downwardly extending flange 66. The horizontal member 64 provides a tie or strap locator that receives a cushion sleeve 100 and stainless-steel tie 110 or strap to secure the cables 90 positioned thereon. The edges of the upper member 60 are coined or rounded to remove any sharp edges that could damages cables 90.

Figure 8:
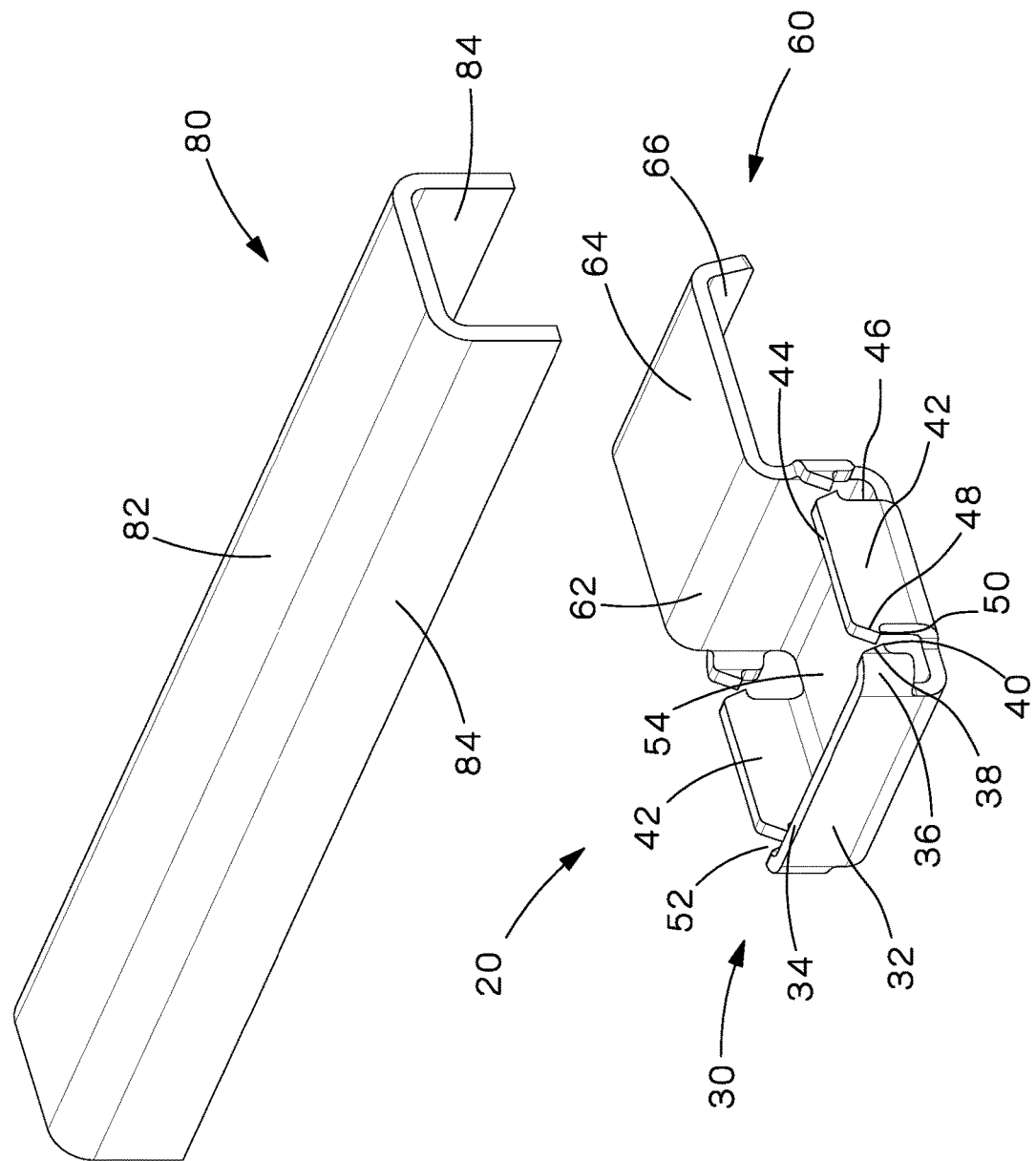
FIG. 8 is a top perspective view of the bracket for cable management of FIG. 1 with a U-shaped ladder rung.

As illustrated in FIG. 8, the U-shaped ladder rung 80 includes a top member 82 and two sidewalls 84 extending from the top member 82 to form a U-shape. The U-shaped ladder rung 80 does not include slots or holes in the top member 82 or in the sidewalls 84.

As illustrated in FIGS. 9A and 9B, the bracket 20 is installed by holding the barbs 40, 50 against the sidewalls 84 of the U-shaped ladder rung 80. The bracket 20 is impacted with a hammer (not illustrated), or similar tool. The angled ramps 38, 48 above the barbs 40, 50 help locate the bracket and reduce the installation force required. As described above, the slots 52 formed by the barbs 40, 50 of the bracket 20 are narrower than the thickness of the sidewalls 84 of the U-shaped ladder rung 80 thereby providing an interference fit with the sidewalls 84 of the ladder rung 80. Once the barbs 40, 50 are separated or opened enough to slide up the sidewalls 84 of the U-shaped ladder rung 80, the hammer is used to tap the bracket 20 into a final position.

Figure 10:
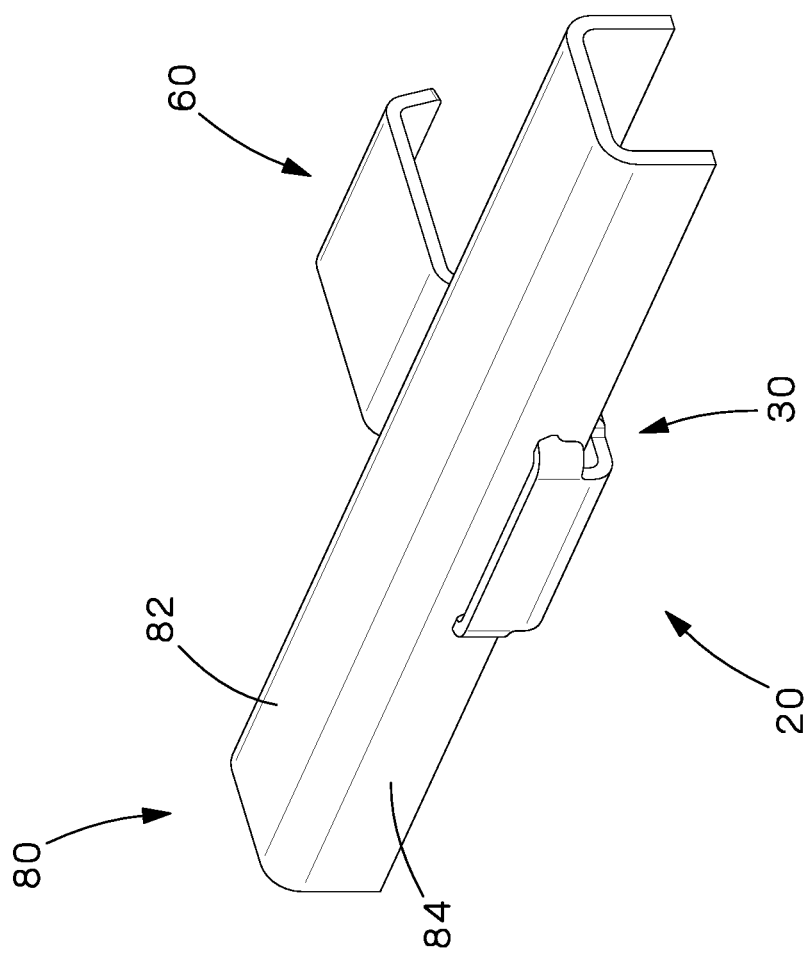
FIG. 10 is a perspective view of the bracket for cable management of FIG. 8 with a U-shaped ladder rung installed in the bracket.
Figure 11:
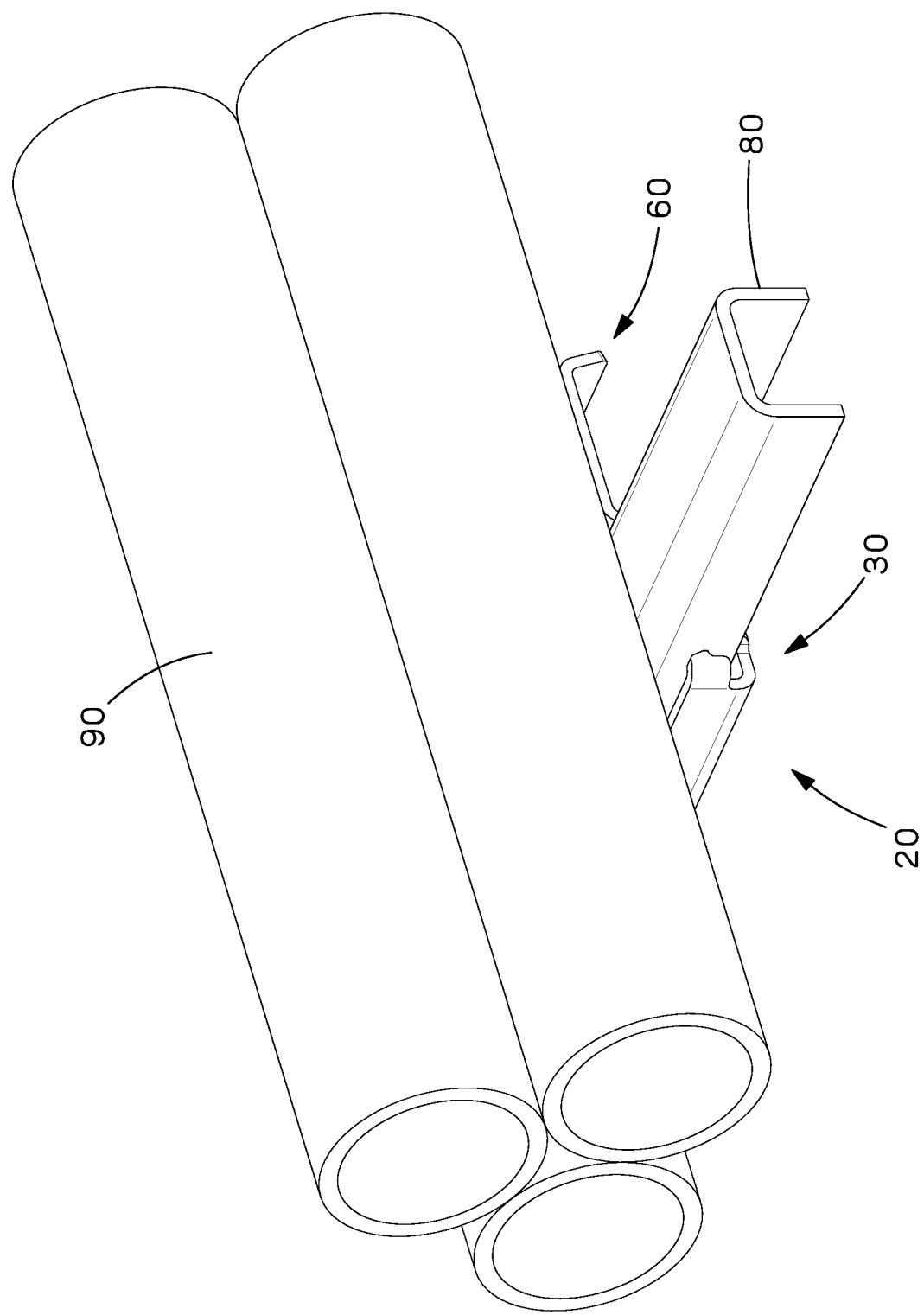
FIG. 11 is a perspective view of the bracket for cable management with the U-shaped ladder rung installed in the bracket of FIG. 10 with a plurality of cables positioned thereon.
Figure 12:
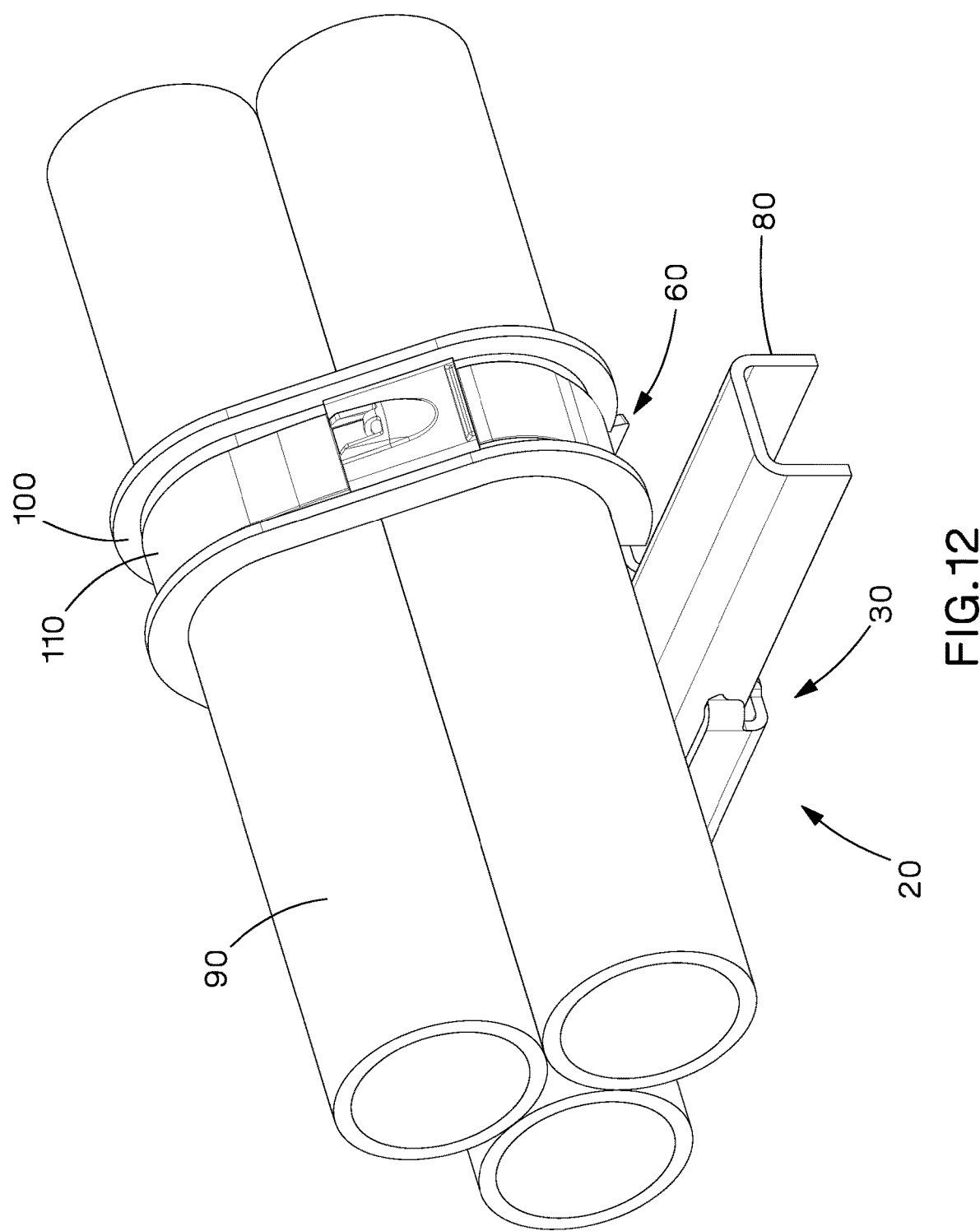
FIG. 12 is a perspective view of the bracket for cable management with the U-shaped ladder rung installed in the bracket of FIG. 11 with the plurality of cables secured via a stainless-steel tie.
Figure 13:
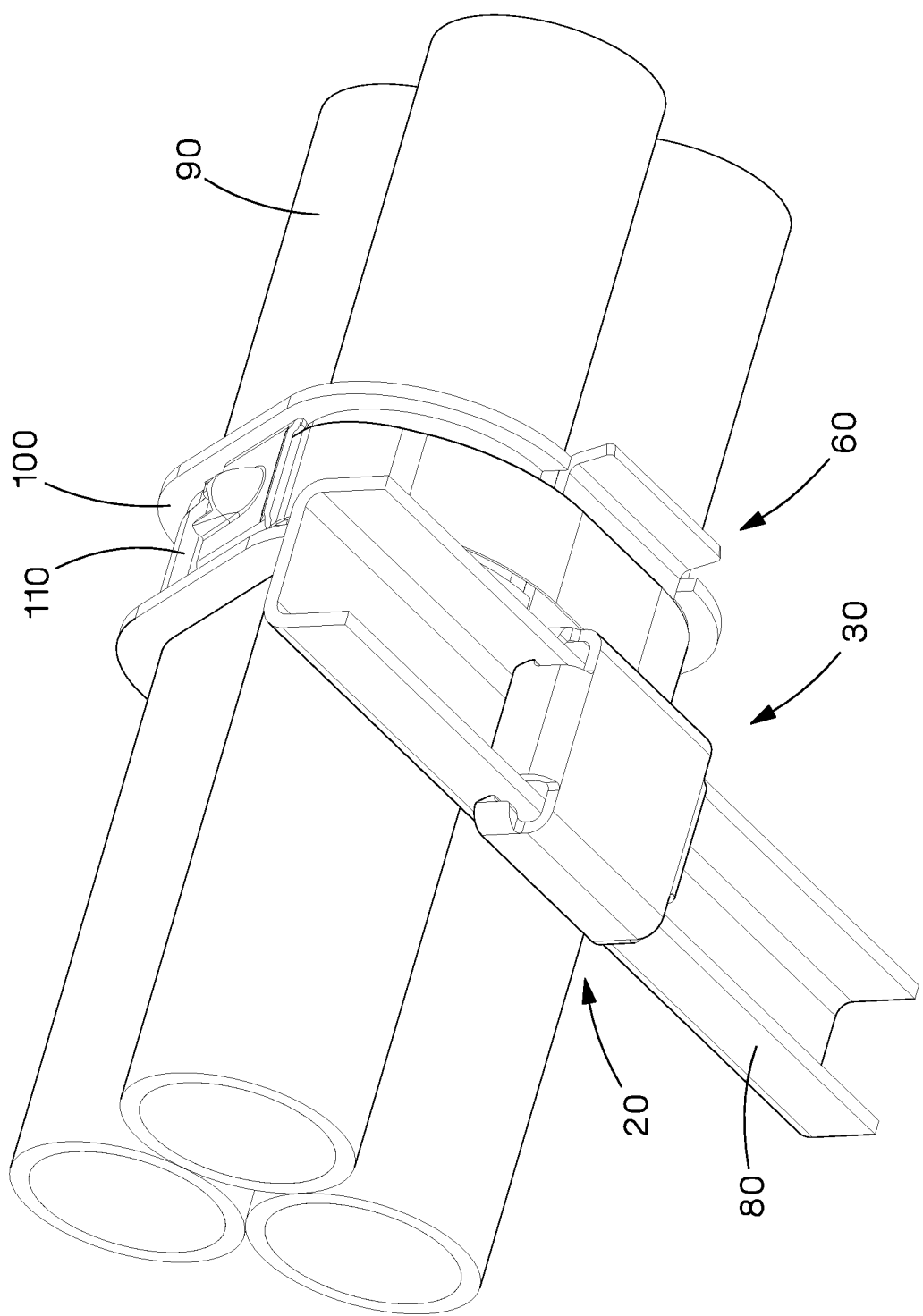
FIG. 13 is a bottom view of the bracket for cable management with the U-shaped ladder rung installed in the bracket of FIG. 12 with the plurality of cables secured by a stainless-steel tie.
Figure 14:
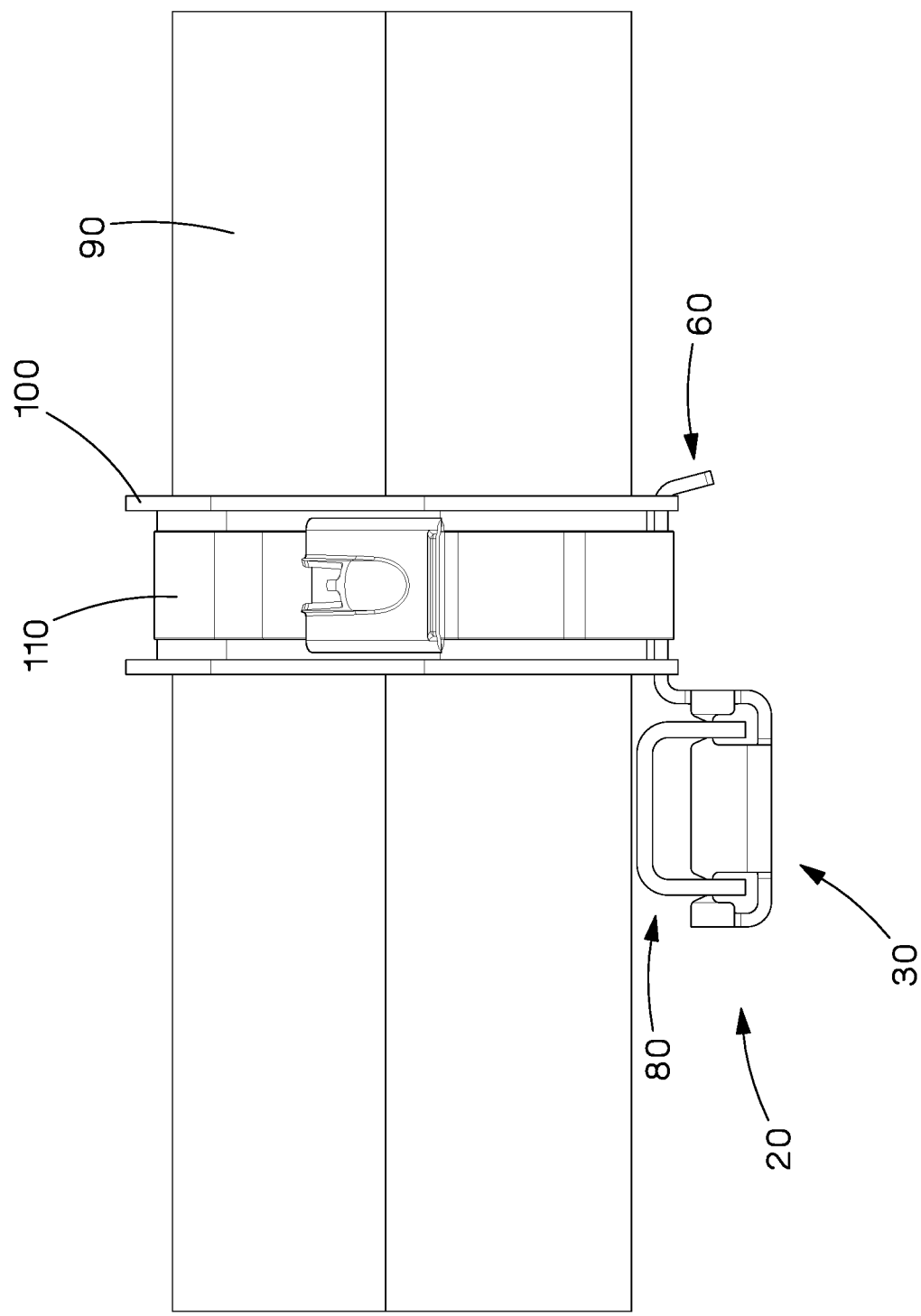
FIG. 14 is a right side view of the bracket for cable management with the U-shaped ladder rung installed in the bracket of FIG. 12 with the plurality of cables secured by a stainless-steel tie.
Figure 15:
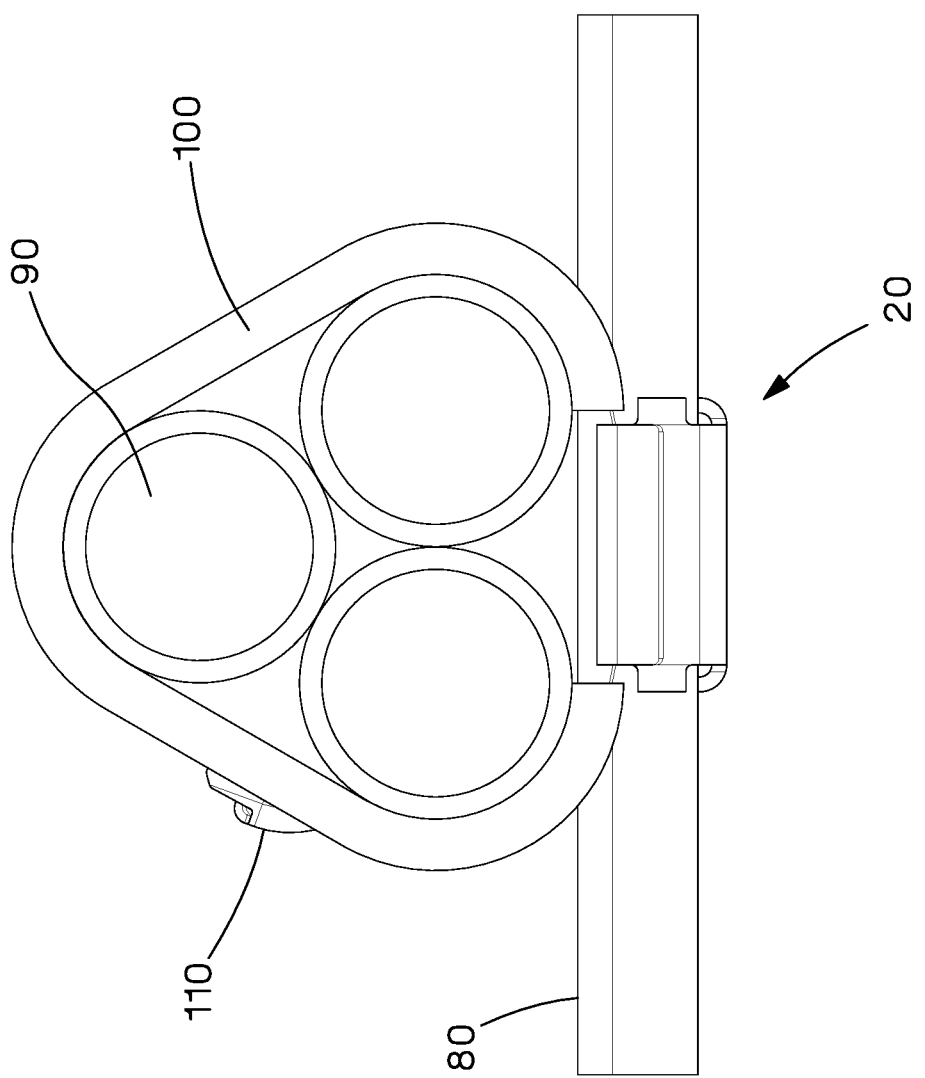
FIG. 15 is a rear view of the bracket for cable management with the U-shaped ladder rung installed in the bracket of FIG. 12 with the plurality of cables secured by a stainless-steel tie.

As illustrated in FIG. 10, the upper member 60 of the bracket 20 is flush with the top 82 of the U-shaped ladder rung 80. The height and the length of the bracket 20 can be selected based on different manufacturing dimensions of U-shaped ladder rungs.

As illustrated in FIGS. 11-15, after the bracket 20 is secured to the U-shaped ladder rung 80, cables 90 can be positioned on the bracket 20 and ladder rung 80. Alternatively, since the bracket 20 is positioned below the cables 90, the bracket 20 can also be installed without moving the cables 90 already positioned on a ladder rack. The cables 90 are secured to the bracket 20 by a cushion sleeve 100 and a stainless-steel tie 110 or strapping.

The bracket 20 of the present invention is used for cable management and short circuit applications. As discussed above, the bracket 20 attaches a cable bundle 90 to a U-shaped ladder rack 80. If all three phases of AC current short out at the same time, the cables 90 repel and attract each other with forces that can be significant. The stainless-steel tie 110 or strapping holds the cable 90 together, while the bracket 20 holds the cable 90 to the ladder rung 80.

The sections of cable 90 between the stainless-steel ties 110 or strapping expand during a short circuit due to the forces exerted on the cables 90. As the cables 90 expand, they often contact the ladder rungs 80 and exert a force on the brackets 20 holding the cable bundle 90 in place. The force is mainly in the direction toward the cable bundle 90. To hold the bracket 20 in place, a force equal and opposite in direction must be applied. Typically, this equal and opposite force would be achieved with the use of a mechanical fastener. However, the bracket 20 of the present invention does not require a mechanical fastener to hold it in place to create the equal and opposite force necessary for proper performance. The bracket 20 of the present invention creates the equal and opposite force via the reinforced barbs 40, 50. The barbs 40, 50 located on the sidewalls 32 and the gusset 42 of the bracket 20 hold the bracket 20 in place when an upward force is applied to the upper member 60 of the bracket 20. The barbs 40, 50 of the sidewalls 32 and the gusset 42 exert a force on the inner surface of the U-shaped ladder rung 80 holding the bracket 20 in place. The barbs 40, 50 hold the bracket 20 in place, hands free, while the stainless-steel tie 110 or strap is being installed.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A bracket for cable management, the bracket comprising:
    a rung insertion area defined by a bottom, sidewalls extending from the bottom, and gussets extending from the bottom and positioned between the sidewalls; wherein each sidewall includes a top and two curved arms and each gusset includes a top and two sides;
    wherein slots are formed between each curved arm of the sidewalls and each side of the gusset; and
    an upper member,
    whereby the bracket is secured to a ladder rung by inserting the ladder rung in the slots of the bracket for cable management on the ladder rung.

2. The bracket of claim 1, wherein each curved arm includes an angled ramp that leads to a pointed barb, wherein each pointed barb extends in a direction away from the sidewall.

3. The bracket of claim 1, wherein the gussets include angled ramps that lead to a pointed barb extending from each side.

4. The bracket of claim 1, wherein the tops of the gussets and the tops of the sidewalls are in the same plane.

5. The bracket of claim 1, wherein the slots are defined by pointed barbs extending from each sidewall and pointed barbs extending from each gusset.

6. The bracket of claim 1, wherein the upper member includes a first curved end extending from the top of one of the sidewalls, a horizontal member, and a downwardly extending flange.

7. The bracket of claim 6, wherein edges of the upper member are rounded for preventing damage to cables secured to the horizontal member.

8. The bracket of claim 6, wherein the horizontal member provides a tie locator for receiving a tie to secure cables positioned on the horizontal member.

9. The bracket of claim 1, wherein each curved arm includes an angled ramp that leads to a pointed barb and each gusset includes and angled ramp that leads to a pointed barb extending from each side.

10. A cable management assembly for securing cables to a ladder rung of a ladder rack; wherein the cable management assembly comprising:
    a bracket having a rung insertion area defined by a bottom, sidewalls extending from the bottom, and gussets extending from the bottom and positioned between the sidewalls; wherein each sidewall includes a top and two curved arms and each gusset includes a top and two sides;
    wherein slots are formed between each curved arm of the sidewalls and each side of the gussets, and an upper member for receiving cables; and
    a metal tie wrapped around the upper member and cables positioned thereon;
    whereby the bracket receives the ladder rung in the slots of the bracket and the metal tie secures the cables to the bracket and the ladder rung.

11. The cable management assembly of claim 10, wherein the slots are narrower than the thickness of the ladder rung to provide an interference fit with the ladder rung.

12. The cable management assembly of claim 10, wherein each curved arm includes an angled ramp that leads to a pointed barb, wherein each pointed barb extends in a direction away from the sidewall.

13. The cable management assembly of claim 10, wherein the gussets include angled ramps that lead to a pointed barb extending from each side.

14. The cable management assembly of claim 10, wherein the tops of the gussets and the tops of the sidewalls are in the same plane.

15. The cable management assembly of claim 10, wherein the slots are defined by pointed barbs extending from each sidewall and pointed barbs extending from each gusset.

16. The cable management assembly of claim 10, wherein the upper member includes a first curved end extending from the top of one of the sidewalls, a horizontal member, and a downwardly extending flange; wherein the horizontal member provides a tie locator for receiving the metal tie to secure the cables positioned on the horizontal member.

17. The cable management assembly of claim 16, wherein edges of the upper member are rounded for preventing damage to the cables secured to the horizontal member.

18. The cable management assembly of claim 10, wherein each curved arm includes an angled ramp that leads to a pointed barb and each gusset includes an angled ramp that leads to a pointed barb extending from each side.

* * * * *